(12) United States Patent
Hanusiak et al.

(10) Patent No.: US 9,875,095 B2
(45) Date of Patent: Jan. 23, 2018

(54) SOFTWARE BUNDLE DETECTION

(71) Applicant: International Business Machines Corporation, Armonk, NY (US)

(72) Inventors: Tomasz Hanusiak, Czarny Dunajec (PL); Michal Klak, Zielonki (PL); Konrad W. Komnata, Cracow (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/870,213

(22) Filed: Sep. 30, 2015

(65) Prior Publication Data

US 2017/0090913 A1   Mar. 30, 2017

(51) Int. Cl.
*G06F 3/00* (2006.01)
*G06F 9/44* (2006.01)
*G06F 9/48* (2006.01)
*G06F 13/00* (2006.01)
*G06F 9/54* (2006.01)

(52) U.S. Cl.
CPC ............. *G06F 8/70* (2013.01); *G06F 8/71* (2013.01); *G06F 9/542* (2013.01)

(58) Field of Classification Search
None
See application file for complete search history.

(56) References Cited

U.S. PATENT DOCUMENTS

| 8,010,947 | B2 | 8/2011 | Carbone et al. | |
| 8,495,569 | B2 | 7/2013 | Yoshimura et al. | |
| 8,549,514 | B2 | 10/2013 | Carteri et al. | |
| 2005/0058268 | A1* | 3/2005 | Koch | H04W 68/005 379/207.16 |
| 2007/0156430 | A1* | 7/2007 | Kaetker | G06F 8/10 717/104 |
| 2010/0115496 | A1* | 5/2010 | Amichai | G06F 11/3688 717/135 |
| 2013/0055202 | A1 | 2/2013 | Dudek et al. | |
| 2014/0279779 | A1* | 9/2014 | Zou | G06N 3/08 706/25 |
| 2016/0055072 | A1* | 2/2016 | Baloch | G06F 11/368 714/38.1 |

OTHER PUBLICATIONS

Wikipedia, The Free Encyclopedia, "ISO/IEC 19770," https://en.wikipedia.org/wiki/ISO/IEC_19770, Jul. 20, 2015, pp. 1-10.
IBM, "Software network connections," IBM Knowledge Center, http://www-01.ibm.com/support/knowledgecenter/SS8JFY_7.5.0/com.ibm.lmt75.doc/com.ibm.license.mgmt.admin.doc/r_rule_sw_network_connection.html%23auditreportlifecycle, printed on Aug. 17, 2015, 1 page.

\* cited by examiner

*Primary Examiner* — Tuan Dao
*Assistant Examiner* — William C Wood
(74) *Attorney, Agent, or Firm* — L. Jeffrey Kelly

(57) ABSTRACT

A method for grouping of software components may be provided. The method may comprise relating a trigger agent to a software component, identifying the trigger agent, and triggering a trigger message of the trigger agent to potential other trigger agents. The method may also comprise monitoring a response to the trigger message from at least one other trigger agent related to at least one other software component, grouping the software components with the at least one other software component based on responses to a group of software components, and relating the group of software components to the software product based on comparisons with a software catalog.

16 Claims, 4 Drawing Sheets

SOFTWARE BUNDLE DETECTION

BACKGROUND

The disclosure relates generally to a method for grouping of software components, and more specifically, to a method for grouping software components that relate as a group to a software product. The disclosure relates further to a grouping system for grouping of software components, and a computer program product.

In today's networked world software products are composed of a plurality of separate components. Especially in service oriented architecture (SOA) environments, software functions and services may require a set of group of software components interacting as an ensemble for delivering a specific service. Thus, software products may be delivered or shipped that include a plurality of software components. Individual software components may be installable independently from each other. Some components may be used by different software products. Hence, they may only be installed once for delivering the services to different software products. One example may be a database component which may be used for different purposes, as part of different products and, in different configurations. Consequently, such a database component may be a part of several different software products.

However, traceability of individual software components belonging to different software products may become a problem. In particular if a complete map of the software components and related software products should be generated, it may result in a confusing picture. Administrators may face the task to manage the different software product installations and ensure that software product license fees or software product maintenance fees are paid correctly. This may result in compliance issues. Administrators need to be able to clearly relate software components to software products and vice versa. One approach uses software tagging and special functions in system management tools to aid in software discovery, inventory, and asset management. However, administrators may be swamped by the different options to identify and relate software components to software products if many hundreds or many thousands of endpoints like laptop computers, servers, mobile phones, tablet computers, etc., need to be monitored so that all software components may be found and mapped.

SUMMARY

According to one embodiment of the present invention, a method for grouping of software components may be provided. The method may include relating a trigger agent to the software component, identifying the trigger agent, triggering a trigger agent message of the trigger agent, and monitoring a response to the trigger agent message from at least one other trigger agent related to at least one other software component. Furthermore, the method may include grouping the software component with the at least one other software component based on the responses to a group of software components, and relating the group of software components to the software product.

According to another embodiment, a grouping system for grouping of software components corresponding to a software product may be provided. The grouping system may include one or more processors, one or more computer-readable storage devices, and a plurality of program instructions stored on at least one of the one or more storage devices for execution by at least one of the one or more processors. The plurality of program instructions include program instructions to identify, by a control agent, a trigger agent relating to a software component, program instructions to trigger, by the control agent, a trigger message of the trigger agent, program instructions to monitor, by the control agent, responses to said trigger message from at least one other trigger agent related to at least one other software component, program instructions to group the software component with the at least one other software component based on the responses to a group of software components and program instruction to relate the group of software components to the software product.

According to another embodiment, a computer program product for grouping of software components corresponding to a software product may be provided. The computer program product includes a computer readable storage medium having program instructions embodied thereon. The program instructions are executable by a processor. The program instructions relate a trigger agent to the software component. The program instructions identify the trigger agent. The program instructions trigger a trigger agent message of the trigger agent. The program instructions monitor the trigger agent message and corresponding responses from at least one other trigger agent related to at least one other software component. The program instructions group the software component with at least one other software component based on the responses to a group of software components and relate the group of software components to the software product.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
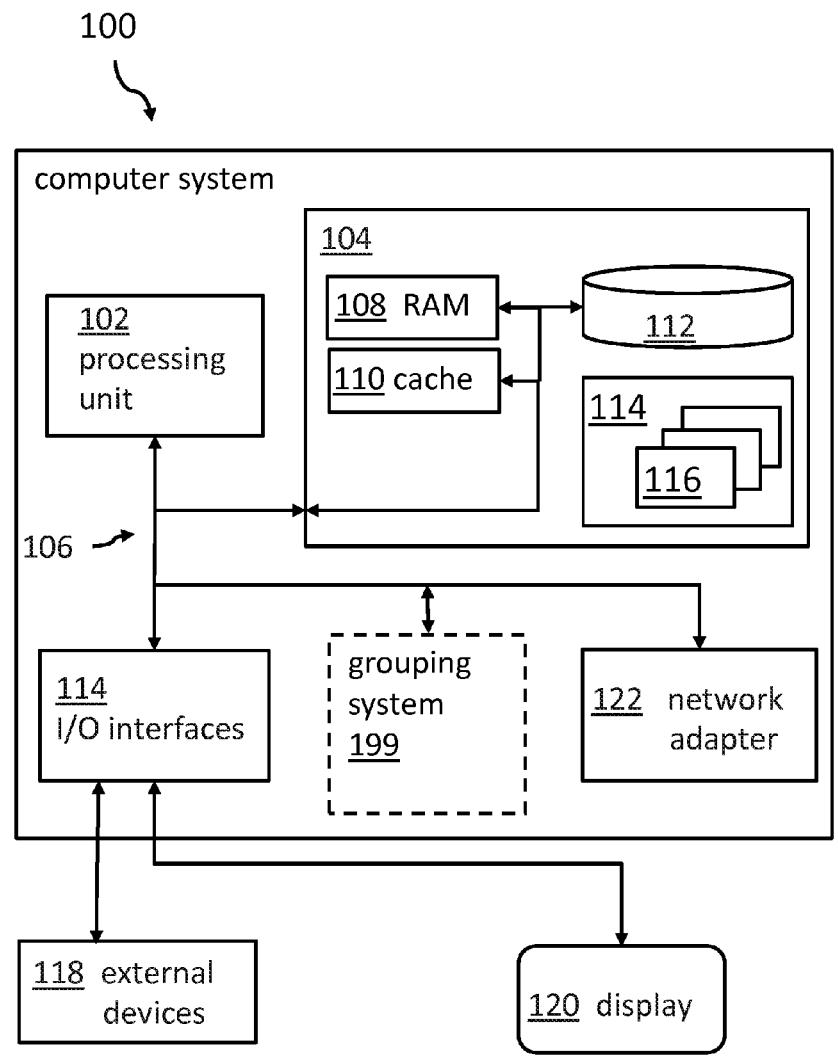
FIG. 1 illustrates an exemplary computer system environment operable for various embodiments of the disclosure.

FIG. 1 illustrates a block diagram of an exemplary computer system (i.e., server) 100 operable for various embodiments of the disclosure. As shown, the server 100 is only one example of a suitable computer for implementing a grouping system for detecting software bundles and is not intended to suggest any limitation as to the scope of use or functionality of embodiments of the disclosure described herein.

The server 100 may be described in the context of executable instructions, such as a program, or more specifically, an operating system (OS) 114 that is an aggregate of program modules, components, objects, logic, or data structures, for example, being executed by the processing unit 102 to control the operation of the server 100. The grouping system can be implemented as specialized related modules 116. However, in one embodiment the grouping system 199 may be implemented at least partially and optionally completely in hardware and may be a separate system which may optionally be connected to the computer system/server 100.

As shown in FIG. 1, the components of the server 100 may include, but are not limited to, one or more processors or processing units 102, a system memory 104, and a bus 106 that couples various system components, such as the system memory 104, to the processing unit 102. System memory 104 can include computer system readable media in the form of volatile memory, such as random access memory (RAM) 108 and/or cache memory 110. The server 100 may further include other removable/non-removable, volatile/non-volatile computer system storage media.

By way of example only, a storage system 112 can be provided as one or more devices for reading from and writing to a non-removable, non-volatile magnetic media, such as a hard disk drive (HDD) or an optical disk drive such as a CD-ROM, DVD-ROM. Each device of the storage system 112 can be connected to bus 106 by one or more data media interfaces. The OS 114, and one or more application programs may be stored on the storage system 112 and subsequently loaded into memory 104 for execution, as needed.

The server 100 may also communicate with one or more external devices 118 such as a keyboard, a pointing device, a display 120, etc.; one or more devices that enable a user to interact with the server 100; and/or any devices (e.g., network card, modem, etc.) that enable the server 100 to communicate with one or more other computing devices. Such communication can occur via I/O interfaces 114.

Server 100 may communicate with one or more networks such as a local area network (LAN), a general wide area network (WAN), and/or a public network (e.g., the Internet) via network adapter 122.

It should be understood that although not shown, other hardware and/or software components could be used in conjunction with the server 100. Examples include, but are not limited to: microcode, device drivers, redundant processing units, external disk drive arrays, RAID systems, tape drives, and data archival storage systems, etc.

Managing the multiple software bundles that may be installed on a server 100 (FIG. 1) includes verifying whether the software licenses that are associated with the software bundles and/or software components are current and accurate. One way of accomplishing this is to create a map of the installed software components, thereby establishing a relationship among them and relating them to the software bundles. In the current context, a software component may include one or more program modules, such as the program modules 116 (FIG. 1), cooperating to provide a program/utility function (114 of FIG. 1). In some examples the software component may operate independently to perform a function, such as a word processing program. When operating independently to perform a function, the software component may also be referred to as a software product. However, a software component may also be a building block with other software components that are bundled together to provide a software bundle. For example, a word processing software product can be bundled together with a database software product, a photo editor software product, and other software products as necessary, to form a work flow software bundle that a magazine publisher may purchase. Hence, the group of interacting software products may be referred to as software components when provided as one software product that may also be referred to as a software bundle. Further, a software product, such as a database product, may be included as a software component in more than one software bundle.

Figure 2:
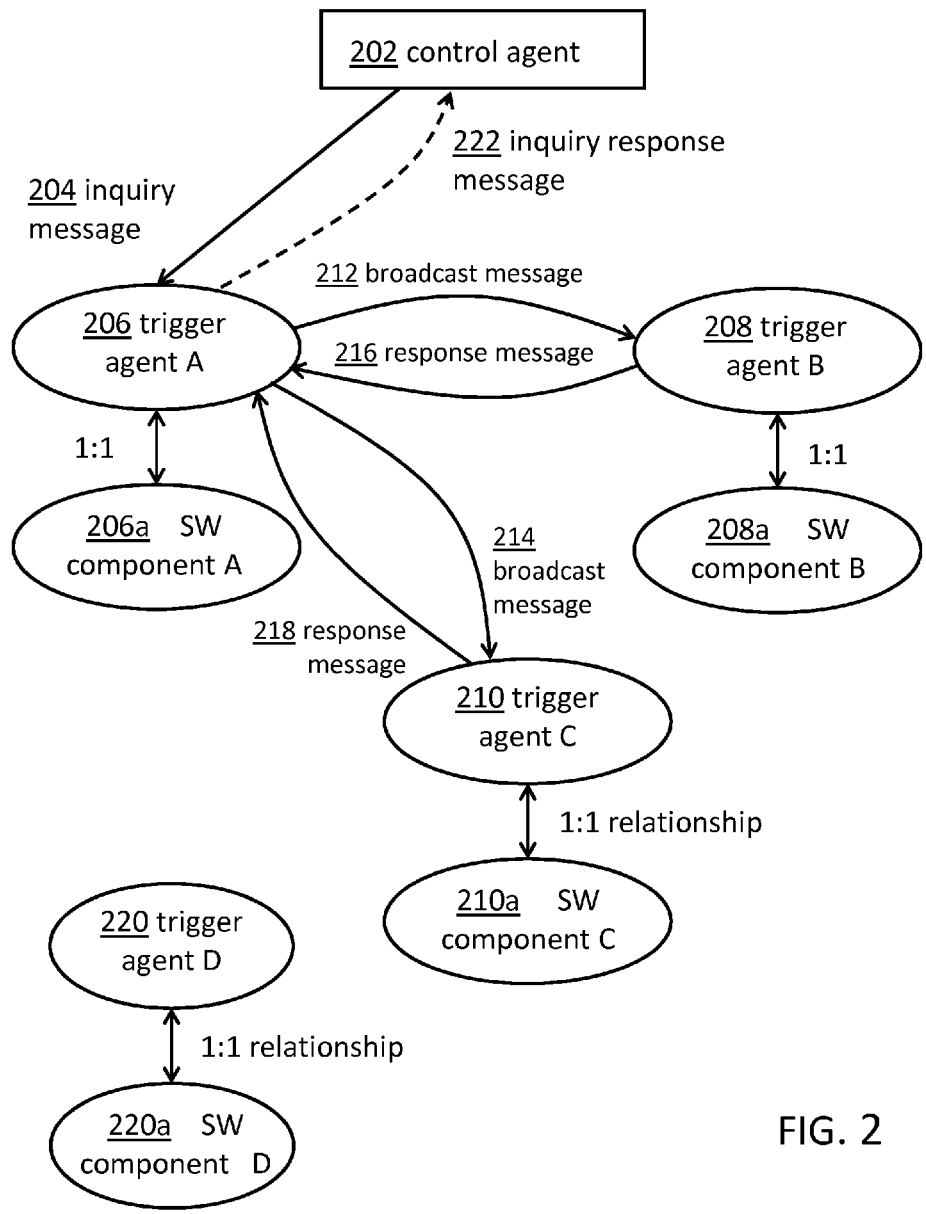
FIG. 2 illustrates the flow of messages and triggers from the control agent to the trigger agents.

FIG. 2 illustrates the flow of messages and triggers from the control agent 202 to the trigger components. Message exchanges between trigger components 206, 208, 210 are also shown. A control agent 202 is configured to monitor one or more servers having software components that may be associated with one or more software bundles. The control agent 202 may identify the target servers to monitor, for example, using a configuration file that includes entries to uniquely identify each target server. An entry may include a TCP/IP address, or a combination of TCP/IP address and hostname. Each entry may further include a TCP/IP or UDP port number through which control agent 202 messages are sent and received. The control agent 202 configuration may further include a catalog of software components, software bundles, and files that are in scope for monitoring. The files may be grouped by component or bundle. An expected location, such as which server and directory, may be included. The control agent 202 may be installed on a separate workstation, server, or on one of the servers that are being monitored.

Each monitored server may include a trigger agent, such as trigger agents 206, 208, 210, and 220. Each trigger agent listens for messages from the control agent 202, from other trigger agents, and from the software components (i.e., 206a, 208a, 210a, and 220a). There is a one-to-one relationship between the trigger agent and the trigger component. Therefore, if several software components reside on a target server, one trigger agent is configured per software component to initiate and respond to messages from the control agent and from other trigger agents that are also configured for that software component. The messages mimic the communication behavior of programs within a software component, or of software components within a software bundle. For example, a customer service representative initiating a session to view a customer record invokes a web browser and enters the customer information. The web browser is programmatically configured to initiate a session with a customer service application that may perform initial processing, such as formatting the customer information into a query, which it directs to a database to retrieve the record. The control agent 202 and trigger agents mimic this relationship by sending simple query messages, similar to a "ping" command in TCP/IP for example, to establish the existence and location of the programs within the calling hierarchy. In this manner, the program calling sequence to retrieve a customer record is established without having to actually invoke the web browser, application, and database. These query messages may include compiled program code or a script. In this context, a script is a program that is interpreted at run-time by a run-time environment, rather than being compiled into object code that can be stored in a binary form for later execution.

The control agent 202 communicates with the monitored servers using several defined message types. Initially, the control agent 202 sends an inquiry message 204 to trigger agent A 206. The inquiry message 204 is configured to query trigger agent A about the existence and directory location of one or more files related to software component A 206a.

Trigger agent A 206 responds with an inquiry response message 222 to the control agent 202. After this identification phase, the control agent 202 sends a broadcast message to trigger agent A 206 to trigger a broadcast message 212, 214 to trigger agent B 208 and trigger agent C 210. As shown, trigger agent B 208, which is aware of the files and directories related to software component B 208*a* may respond with the files and locations in a response message 216. Similarly, trigger component C 210 which is aware of the files and directories related to software component C 210*a* may respond with the files and locations in a response message 218.

It may be noted that only those trigger agents may respond to the broadcast message 212, 214 that work in cooperation and consequently belong to the same software product. Another trigger agent 220 relating to a software component D 220*a* may not respond to any broadcast message from trigger agent A 206. Thus, only those trigger agents react to a broadcast message that interact with each other and may form a group to be identified as a software product.

By monitoring the message exchange between trigger agent A 206 and trigger agent B 208 as well as between trigger agent A 206 and trigger agent C 210, the control agent 202 may group the trigger agents A, B, C—206, 208, 210, respectively—and related software components A, B, C. This group may be related to a software product by a comparison of the software components with a software component library (not shown), or with the software components defined as within scope.

As a final message from control agent 202, a distinguish message (not shown) may be sent to all identified trigger agents 206, 208, 210 which may have been identified as a group of related software components 206*a*, 208*a*, 210*a* belonging to a product may not respond to any further broadcast messages from other trigger agents that may have been activated by the control agent 220 by a broadcast message.

Figure 3:
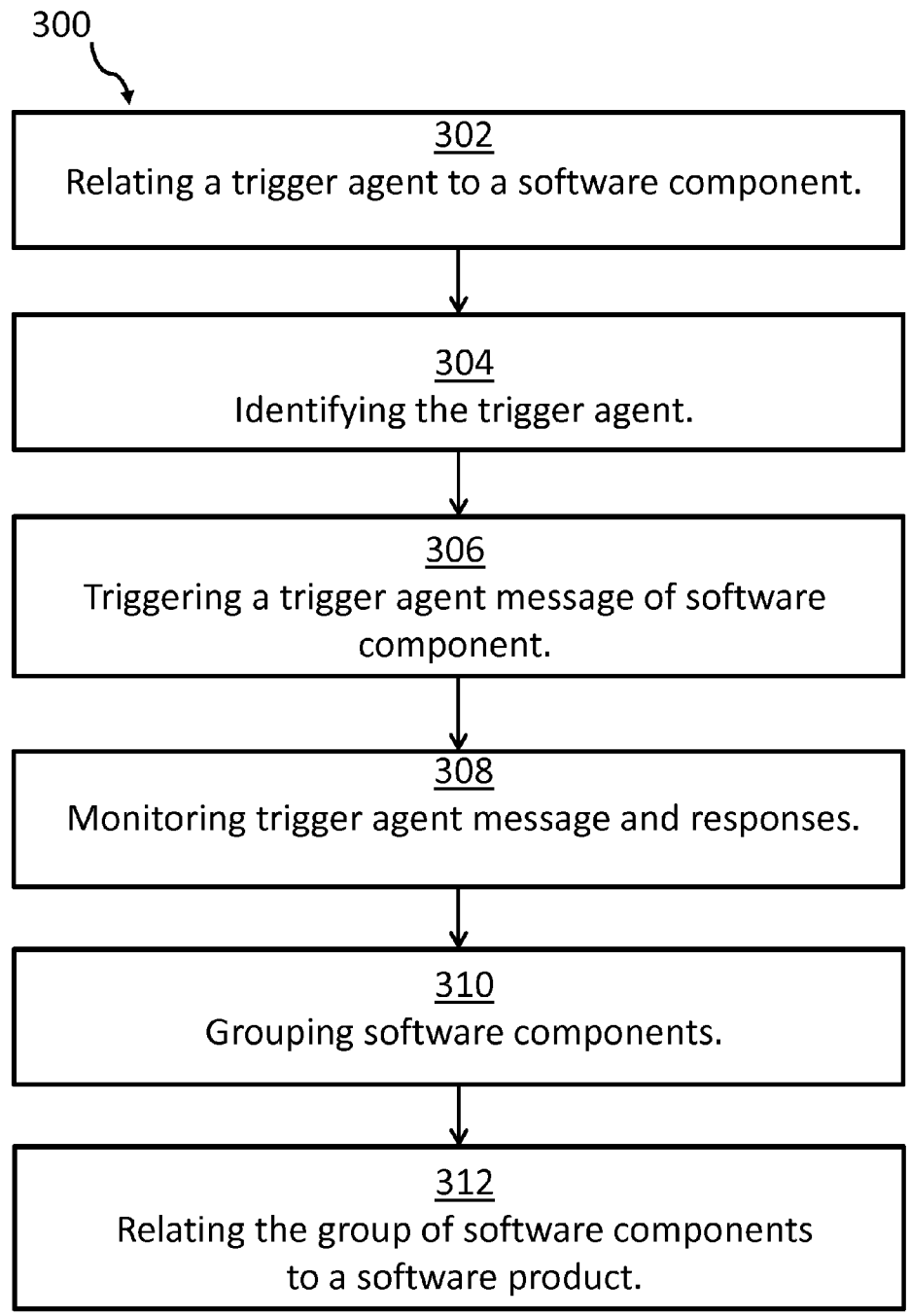
FIG. 3 illustrates a block diagram of an embodiment of an algorithm for grouping software components.

FIG. 3 illustrates an algorithm 300 for identifying and grouping software components. At 302, a trigger agent (i.e., 206, 208, 210) which may be implemented as a script or compiled program for mimicking the communication behavior of the related software component to the software component. At 304 the trigger agent is identified. This may be done by sending an inquiry message 204 from a control agent 202. An inquiry response message 222 may indicate to the control agent 202 that the addressed file is a trigger agent.

Furthermore, the method may include triggering, 306, a trigger agent message. This may be the above-mentioned broadcast message. The trigger agent message is monitored, 308, for at least one response from another trigger agent (i.e., 206, 208, 210) related to at least one other software component (206*a*, 208*a*, 210*a*). At 310, based on the responses from the trigger agents, the control agent 202 groups the discovered files into one or more groups of software components. At 312, the group of software components are related to the software product.

According an embodiment of the present disclosure, the trigger agent may be a script. However, alternate, equivalent software components or hardware modules may be possible. This may represent a light-weight implementation method. Other implementation methods do not change the general concept.

According to another embodiment of the present disclosure, the trigger agent and the related software component are stored in the same sub-directory of a file system. A direct relationship of a software component and a related trigger agent may be achieved by naming related triggers and files with a common element, such as a prefix.

According to another embodiment of the present disclosure, the trigger agents may be stored in different file systems on different servers. Therefore software components can be identified even if they may be used in a distributed computing environment, i.e., different software components of a software product are store on different servers or systems.

According to another embodiment of the present disclosure, triggering the trigger message of the trigger agent and the corresponding responses are based on a network protocol such as TCP/IP or UDP. In case of using the UDP protocol, a lightweight protocol version may reduce potential overhead generated by the messaging among the agents. In this context, a lightweight protocol is a network protocol having an architecture to reduce complexity in network packets thereby increasing efficiency and transmission speed.

According to another embodiment of the present disclosure, the trigger agent mimics a communication behavior of the related software component. Therefore, the software component does not need to be started. The trigger agent, e.g., implemented as a script or another related software program, mimics the communication reaction of the software component through sending and receiving short trigger messages. Thus, the messages sent from one trigger agent to another are a placeholder communication which may be monitored without an overhead of a fully active software component.

In another embodiment, relating the group of software components to the software product is based on comparing elements of the group of software components with a software catalog. In particular, software components that have been identified by and that have been grouped together may be compared to the software catalog which may relate the group of software components to a specific software product. Thus, software components found in a distributed computing system comprising a plurality of servers with a plurality of file systems and/or network attached storage systems may be identified and grouped together without any tagging of the software components.

In another embodiment, the trigger agent receives a message, including an inquiry message, a response message, a broadcast message, and an extinguish message from the control agent. The inquiry message to a file found in the file system may detect whether the file is a trigger agent or not. If a trigger agent may be found, the control agent may send a broadcast message to the identified trigger agent. This may trigger a broadcast message from the trigger agent to potential other trigger agents. The extinguish message may put the identified trigger agent which may have issued its broadcast message asleep so that no circular broadcast messaging activity may be triggered.

Figure 4:
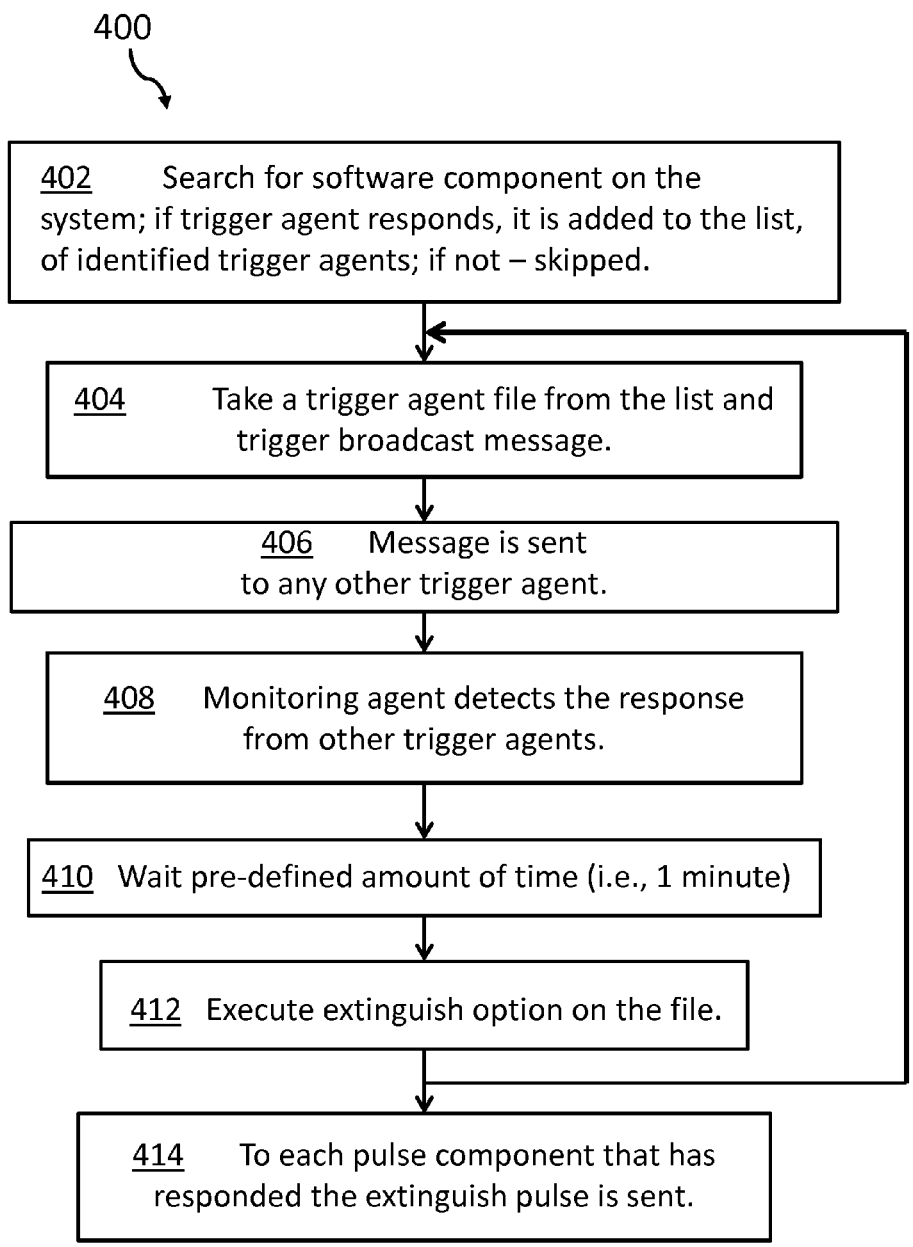
FIG. 4 illustrates a more detailed flowchart of the algorithm of FIG. 3 for grouping software components.

FIG. 4 shows a more detailed flowchart 400 of the algorithm 300 of FIG. 3. It may be assumed that a control agent may be part of the grouping system. At 402, the control agent may search software components by identifying files in a storage system. To each of the identified files an inquiry message may be sent. If the file is a trigger agent, the trigger agent may respond with an existence message indicating to the control agent the existence of a trigger agent. Consequently, in the context of this system, a related software component exists. If the control agent receives such an existence message, the control agent may add the related software component to a list of found software components. Otherwise, the control agent will continue with the next found file in the storage system, e.g., in a file system.

At 404, the control agent selects a trigger agent relating to a software component and send a broadcast message to the trigger agent. The trigger agent responds with a broadcast message mimicking a communication behavior of the related software component. This may mean that at 406 the trigger agent may generate identical message constructs with identical addressing schemes, e.g., port numbers, as from the related software component. However, when the trigger agent is a lightweight script (i.e., one designed to have a small memory footprint) the discovery and messaging overhead may be less impactful to overall system performance compared to starting the software component and letting it communicate.

As a next step, 408, the control agent or, a component of the control agent which may be implemented as a monitoring agent may monitor the network traffic. This way, the broadcast message sent from the addressed trigger agent as well as corresponding responses from other trigger agents relating to other software components may be observed. The control agent and/or monitoring agent may detect network signals at predefined particular communication ports.

After waiting a pre-defined and configurable amount of time, e.g., one minute, the control agent may send an extinguish message to the originally selected trigger agent to which the broadcast message has been sent (steps 410 and 412). This reduces the potential that trigger agent A will react to a broadcast message from a trigger agent B if trigger agent B is addressed by the control agent while issuing a broadcast message. This way, an endless circling of the software component grouping process may be prohibited.

At step 414, a distinguish message may be sent from the control agent to each of the trigger agents that reacted to the broadcast message sent from trigger agent A.

Thus, three different message may be sent from the control agent to trigger agents: 1) an inquiry message for determining that the identified file is a trigger agent based on a response message from the trigger agent to the control agent; 2) a broadcast message for triggering a broadcast message for the identified trigger agent which mimics a real communication behavior of the related software component as a response to the received broadcast message from the control agent; and 3) an extinguish message stopping responses to received broadcast messages from other software components if they have been triggered by a broadcast message.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for grouping of software components corresponding to a software product, said method comprising:
   relating a trigger agent to said software component, wherein relating said trigger agent to said software component is based on configuring said trigger agent, by a control agent, to initiate and respond to one or more trigger agent messages from said control agent and one or more secondary trigger agents associated with at least one secondary software component;
   identifying, by said control agent, said trigger agent, wherein identifying said trigger agent further comprises said trigger agent receiving an inquiry message from said control agent and communicating a response message to said control agent, the response message includes an addressed file associated with said trigger agent;
   triggering, by said control agent, said one or more trigger agent messages of said trigger agent, wherein said trigger agent message of said trigger agent is a script mimicking communication behavior of said related software component at run-time in a run-time environment;
   monitoring a response to said trigger agent message from at least one of said one or more secondary trigger agents related to said at least one secondary software component;
   communicating an extinguish message to said one or more secondary trigger agents, based on receiving a response from said one or more secondary trigger agents;
   grouping said trigger agent and said one or more secondary trigger agents based on the monitored responses;
   grouping said software components with said at least one secondary software component based on said software components related to said grouped trigger agent and said at least one secondary software components associated with said at least one grouped secondary trigger agents; and
   relating said group of software components to said software product.

2. The method according to claim 1, wherein said trigger agent and said related software component are stored in a same sub-directory of a file system.

3. The method according to claim 1, wherein said trigger agent and said at least one other trigger agent are stored in different file systems on different servers.

4. The method according to claim 1, wherein said triggering said trigger agent message of said trigger agent and said corresponding responses are based on a network protocol.

5. The method according to claim 1, wherein said relating said group of software components to said software product is based on comparing elements of said group of software components with a software catalog.

6. The method according to claim 1, wherein said trigger agent receives a message selected out of the group comprising an inquiry message, a broadcast message and an extinguish message.

7. The method according to claim 6, wherein said trigger agent generates a response message after receiving said broadcast message.

8. A grouping system for grouping of software components corresponding to a software product, the grouping system comprising:
   one or more processors, one or more computer-readable storage devices, and a plurality of program instructions stored on at least one of the one or more storage devices for execution by at least one of the one or more processors, the plurality of program instructions comprising:

program instructions to relate a trigger agent to said software component, wherein program instructions to relate said trigger agent to said software component is based on program instructions to configure said trigger agent, by a control agent, to initiate and respond to one or more trigger agent messages from said control agent and one or more secondary trigger agents associated with at least one secondary software component;

program instructions to identify, by a control agent, said trigger agent, wherein program instructions to identify said trigger agent further comprises said trigger agent receiving an inquiry message from said control agent and program instructions to communicate a response message to said control agent, the response message includes an addressed file associated with said trigger agent;

program instructions to trigger, by the control agent, said one or more trigger agent messages of said trigger agent, wherein said trigger agent message of said trigger agent is a script mimicking communication behavior of said related software component at run-time in a run-time environment;

program instructions to monitor, by the control agent, responses to said trigger agent messages from at least one of said one or more secondary trigger agents related to said at least one secondary software component;

program instructions to communicate an extinguish message to said one or more secondary trigger agents, based on receiving a response from said one or more secondary trigger agents;

program instructions to group said trigger agent and said one or more secondary trigger agents based on the monitored responses;

program instructions to group said software component with said at least one secondary software component based on said software components related to said grouped trigger agent and said at least one secondary software components associated with said at least one grouped secondary trigger agents; and program instruction to relate said group of software components to said software product.

9. The grouping system according to claim 8, comprising a storage location, wherein said trigger agent and said related software component are stored in a same subdirectory of a file system.

10. The grouping system according to claim 8, wherein said trigger agent and the at least one other trigger agent are stored in different file systems on different servers.

11. The grouping system according to claim 8, wherein communicating messages within said grouping system is based on a network protocol.

12. The grouping system according to claim 8, wherein the program instructions to group said group of software components to said software product is based on comparing elements of said group of software components with a software catalog.

13. The grouping system according to claim 8, wherein said control agent generates a message selected out of the group comprising an inquiry message, a broadcast message and an extinguish message.

14. The grouping system according to claim 13, wherein said trigger agent initiates a response message after receiving a broadcast message from said control agent.

15. A computer program product for grouping of software components corresponding to a software product, said computer program product comprising:

a grouping system embodied on a computer readable storage medium, the grouping system including program instructions executable by a processor, the program instructions comprising:

program instructions to relate a trigger agent to said software component, wherein program instructions to relate said trigger agent to said software component is based on program instructions to configure said trigger agent, by a control agent, to initiate and respond to one or more trigger agent messages from said control agent and one or more secondary trigger agents associated with at least one secondary software component;

program instructions to identify, by a control agent, said trigger agent, wherein program instructions to identify said trigger agent further comprises said trigger agent receiving an inquiry message from said control agent and program instructions to communicate a response message to said control agent, the response message includes an addressed file associated with said trigger agent;

program instructions to trigger, by a control agent, said one or more trigger agent messages of said trigger agent, wherein said trigger agent message of said trigger agent is a script mimicking communication behavior of said related software component at run-time in a run-time environment;

program instructions to monitor said trigger agent message and corresponding responses from at least one of said one or more secondary trigger agents related to said at least one secondary software component;

program instructions to communicate an extinguish message to said one or more secondary trigger agents, based on receiving a response from said one or more secondary trigger agents;

program instructions to group said trigger agent and said one or more secondary trigger agents based on the monitored responses;

program instructions to group said software component with said at least one secondary software component based on software components related to said grouped trigger agent and said at least one secondary software components associated with said at least one grouped secondary trigger agents; and program instruction to relate said group of software components to said software product.

16. The computer program product according to claim 15, wherein the program instructions to group said group of software components to said software product is based on comparing elements of said group of software components with a software catalog.

* * * * *